United States Patent [19]
Delaney et al.

[11] Patent Number: 5,096,787
[45] Date of Patent: Mar. 17, 1992

[54] HYDROSTATIC PUMP WITH STATIC RESISTANCE FOR A MOBILE VEHICLE BATTERY

[75] Inventors: William C. Delaney, Saukville; William J. Wruck, Shorewood, both of Wis.

[73] Assignee: Globe-Union, Inc., Milwaukee, Wis.

[21] Appl. No.: 562,477

[22] Filed: Aug. 3, 1990

[51] Int. Cl.⁵ ............................................. H01M 2/38
[52] U.S. Cl. ................................................... 429/81
[58] Field of Search ..................................... 429/51, 81

[56] References Cited

U.S. PATENT DOCUMENTS

| | | | |
|---|---|---|---|
| 3,083,253 | 3/1963 | Sundborg | 429/51 |
| 4,565,748 | 1/1986 | Dahl | 429/81 X |
| 4,945,011 | 7/1990 | Tanaka | 429/81 |
| 4,963,444 | 10/1990 | Delaney | 429/67 |

Primary Examiner—Stephen J. Kalafut
Attorney, Agent, or Firm—Foley & Lardner

[57] ABSTRACT

A hydrostatic pump for application in a battery experiencing sudden changes in acceleration or direction such as in a golf cart. The cells of the battery are provided with hydrostatic pumps using the motion induced waves in the electrolyte to develop localized hydrostatic heads and create circulation in the electrolyte.

11 Claims, 3 Drawing Sheets

HYDROSTATIC PUMP WITH STATIC RESISTANCE FOR A MOBILE VEHICLE BATTERY

BACKGROUND OF THE INVENTION

1. Field of the Invention

This application is related to U.S. patent application Ser. No. 07/358,688 filed May 30, 1989. and assigned to the same assignee as the present invention.

This invention relates generally to batteries and more specifically to batteries which benefit from electrolyte circulation.

It has been known that in secondary batteries, such as those typified by lead acid batteries using aqueous sulfuric acid or liquid electrolyte, that the electrolyte tends to stratify when cycled. The stratification becomes aggravated during charge and recharge, affects cell performance and reduces battery life time. Additionally, ambient heat and efficient distribution of the internally generated heat are problems where the electrolyte is essentially stagnant.

2. Description of the Prior Art

The prior art is replete with examples of various devices used to circulate electrolyte in secondary batteries or otherwise prevent stratification. U.S. Pat. No. 916,320 issued on Mar. 23, 1909 to H. F. Joel illustrates a technique of tapering a center electrode in a circular battery and slanting the outer conical electrode relative to the separators such that the gas collecting on either side of the separator moves upward and accumulates in ever narrowing passageways, forcing electrolyte as bubbles up through orifices at the top and then over to the outside of the outer electrode where it moves downward. According to the patentee this draws the denser electrolyte from the bottom of the battery. U.S. Pat. No. 2,584,117 issued on Feb. 5, 1952 to Elrod Jr. also recognized the problem and proposed the use of an air blown device to aerate the electrolyte to alter the density thereof to create circulation. Still another, U.S. Pat. No. 4,283,467 issued Aug. 11, 1981 to Gutlich, et.al., discloses a device that also utilizes gas to alter electrolyte density. U.S Pat. No. 4,308,322 issued Dec. 29, 1981 to Hammar describes a pump within the battery comprising a gas collecting hood and passageways which utilize the generated gas to carry electrolyte as bubbles to the passageways, thus inducing circulation. Another design to reduce stratification is disclosed in U.S. Pat. No. 4,619,875 issued Oct. 28, 1986 to D. W. Stahura, et.al. in which the separator has a plurality of laterally extending concave ribs on the surface thereof that act to trap the more dense electrolyte.

U.S. Pat. No. 529,199 issued Nov. 13, 1894 to Schoop represents an early attempt to provide circulation of electrolyte by harnessing the energy created through changes in velocity of the vehicle utilizing the battery. Schoop describes several embodiments of pumps for accomplishing such circulation, one of which involves creating a hydrostatic head from laterally moving waves in the free electrolyte. As typified by Schoop, such pumps involving hydrostatic heads are generally defined by one wall spaced from the cell wall. The second wall extends a short distance above the surface of the liquid end, together with the cell wall, forms a mouth of the pump. An "outlet" of the pump is formed by the bottom end of the second wall terminating slightly above the bottom of the cell. The theory of operation of such a pump is that the mouth captures a portion of the liquid contained in the wave caused by changes in the velocity of the vehicle carrying the cell. Once captured, the additional liquid within the pump becomes a hydrostatic head and dissipates downward and out the opening between the distal end of the second wall as a current of electrolyte.

A significant drawback of hydrostatic pumps represented by Schoop, particularly the embodiment of FIG. 3 thereof, is the inability to cope with the "splashing" that occurs at the wall of the cell. For example, when the cell holding the liquid abruptly stops, the need of the liquid to exchange its momentum results in several disturbances. First, a laterally moving surface wave is generated which crests substantially at the wall in the direction of wave movement. Simultaneously, the underlying liquid impinging against the wall tends to move rapidly up the wall and literally causes a splash to occur at the crest of the overlying wave. The splashing, in effect, prevents the formation of any meaningful hydrostatic head within the pump. Pumps typified by Schoop resort to moving valve mechanisms which close against the pressure of upward liquid movement and open once the pressure subsides to allow the hydrostatic head to dissipate.

Application Ser. No. 07/201,042 filed May 31, 1988 and entitled "Internal Hydrostatic Pump For A Mobile Vehicle Battery", assigned to the same assignee of the present invention, discloses a simple and essentially maintenance free static pump for utilizing the laterally moving surface waves induced in the electrolyte. The vertical surge of the electrolyte, or splashing, is maintained at low levels due to geometrical differentials between upper and lower dimensions of the pump.

As the foregoing shall describe, applicants have further refined the aforementioned static pump to reduce the volume of the vertical surge of electrolyte occurring when a change of velocity is experienced and to isolate sediments occurring beneath the electrode plates.

SUMMARY OF THE INVENTION

A hydrostatic pump, in accordance with one embodiment of the present invention, has no moving parts and utilizes the change in velocity of a vehicle in which a battery incorporating the invention is placed to throughly mix the electrolyte in the battery. The invention comprises a hydrostatic pump element in the form of a partition bridging the side walls of the cell container and spaced apart from an end wall. The partition captures the laterally moving surface waves created in the electrolyte caused by acceleration or deceleration of the vehicle in which the battery is positioned. The partition which is traversed by a wave of electrolyte traps a portion thereof in a confined region defined by the partition, end wall and connecting side walls. The additional electrolyte in the confined region induces a hydrostatic head therein causing electrolyte to move downward in the confined region and then outward through an opening communicating with the electrolyte volume outside of the confined region. This movement stimulates flow currents within the electrolyte, reducing electrolyte stratification and increasing heat transfer efficiency. Static retarding means located in a portion of the confining region retard and otherwise significantly reduce the upward vertical movement of electrolyte experienced in the confined region due to vehicular velocity changes and, additionally, may be utilized to filter sediments moving with the circulating electrolyte or remove undesirable ions and impurities. Such filtering function and impurity removal serves to isolate the sediments from the electrode plates and remove undesirable ions and impurities.

BRIEF DESCRIPTION OF THE DRAWINGS

A preferred exemplary embodiment of the present invention will hereinafter be described wherein like numerals denote like elements and:

FIG. 5b is a front view of the pump shown in FIG. 5a.

FIG. 5c is a rear view of the pump shown in FIG. 5a.

DETAILED DESCRIPTION OF THE PREFERRED EMBODIMENT

Figure 2:
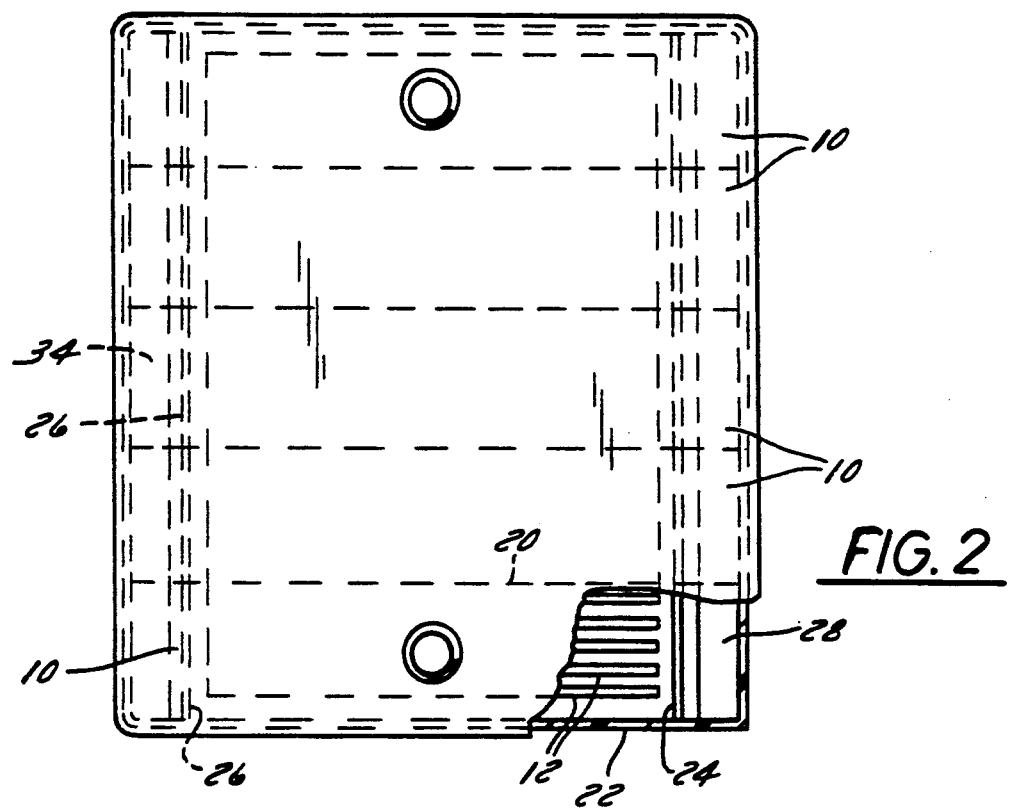
FIG. 2 is a top view of the battery having cells identical to FIG. 1.

A wave is a disturbance propagated in a medium, e.g., a liquid, in such a manner that at any point in the medium the displacement is a function of time while at any point in time the displacement is a function of the position of the point. As the wave passes a region of the medium, the particles of the medium in that region are displaced temporarily but then return to essentially their original position once the wave has passed.

Once generated, a wave will continue moving until dissipated by viscous forces or drag forces, the latter resulting from a stationary object lying near or slightly above the surface of the medium. A wave, which is propagated against a surface of a thin width which extends out a short distance above the normal or "at-rest" surface of the medium, will move over the surface, part of the energy of the wave being dissipated against the surface and continue. In the situation where the surface is in close proximity to a vertical surface, the wave will be reflected by the vertical surface causing a secondary wave to be propagated in the opposite direction traversing the thin width surface and continue as a wave of lessened energy, assuming the vertical surface extends above the height of the continuing wave and below the surface a sufficient distance to change the momentum of essentially the entire wave.

Applicants have recognized that the aforementioned phenomena may be used to vitiate undesired stratification of electrolyte in certain batteries. In accomplishing this, applicants have harnessed the energy of waves created in the free electrolyte in a battery employed in a mobile environment, e.g., golf cart vehicles, fork lift trucks, boats or automobiles, when the battery, and therefore the electrolyte, experiences changes in velocity by either variations in the magnitude or direction of the velocity. The energy of such waves is employed by a hydrostatic pump device in accordance with the present invention to induce a hydrostatic head in a localized region, i.e., the "hydrostatic pump", of the electrolyte which dissipates into an underlying electrolyte flow. The resulting flow reduces stratification of the electrolyte providing the concommitant advantages thereof.

Increasing the fluid level to initiate pumping action depends upon the "net electrolyte acceleration" towards the battery side wall which supports the pump. By "net acceleration" it is meant that viewed from the side wall, the electrolyte moves toward the wall. This action results in an increased fluid level as the acceleration forces work to position more fluid closer to the wall. Energy is then stored through the elevation of the fluid adjacent to the wall. This stored energy may be captured by a reservoir enclosure located at the top of the pump. As the acceleration forces supporting the elevated fluid diminish, trapped electrolyte in the pump reservoir is then directed downward to the bottom of the cell by a vertical conduit of the pump.

The desirable electrolyte acceleration toward the pump can result from any of several mechanisms. For example, the strongest accelerating forces in an automotive environment result from the braking of the vehicle. Thus, it is important that a component of the rapid deacceleration of the vehicle be appropriately aligned with the hydrostatic pump. Generally the electrode plates and the pump will be parallel. The deacceleration of the vehicle causes the container wall and pump to slow down. The electrolyte continues to move within the container towards the side wall causing a net acceleration of fluid towards the pump. A similar effect occurs when a vehicle changes direction. The container exhibits a centripetal acceleration toward the center of the turning radius. The inertia of the electrolyte resists this change in direction resulting in an acceleration of fluid toward the pump. Another means of creating a net acceleration of electrolyte toward the pump is to accelerate the pump in such a manner that it moves increasingly faster toward the center mass of the electrolyte.

The required action necessary to pump liquid occurs over two distinct flow periods. The first is the "filling flow" period (that time period over which the pump head tank or mouth area fills). The second time period is that over which the liquid (which has temporarily filled the head tank) drains or "draining flow" period. The first flow period is of relatively short duration (that amount of time necessary for a surface wave to crest into the mouth of the pump), thus to provide adequate liquid flow into the mouth limited flow restriction is desired. That is, since the time period over which potential for "filling flow" exists, it is desirable to have as free of flow as possible. The second time period can vary in duration since once the liquid is captured, sufficient driving force will exist (i.e., the induced liquid head) until the liquid columns formed by the pump fixture and the cell liquid equalize. As discussed in more detail below, it has been determined to be important for the most efficient pump operation.

Figure 1:
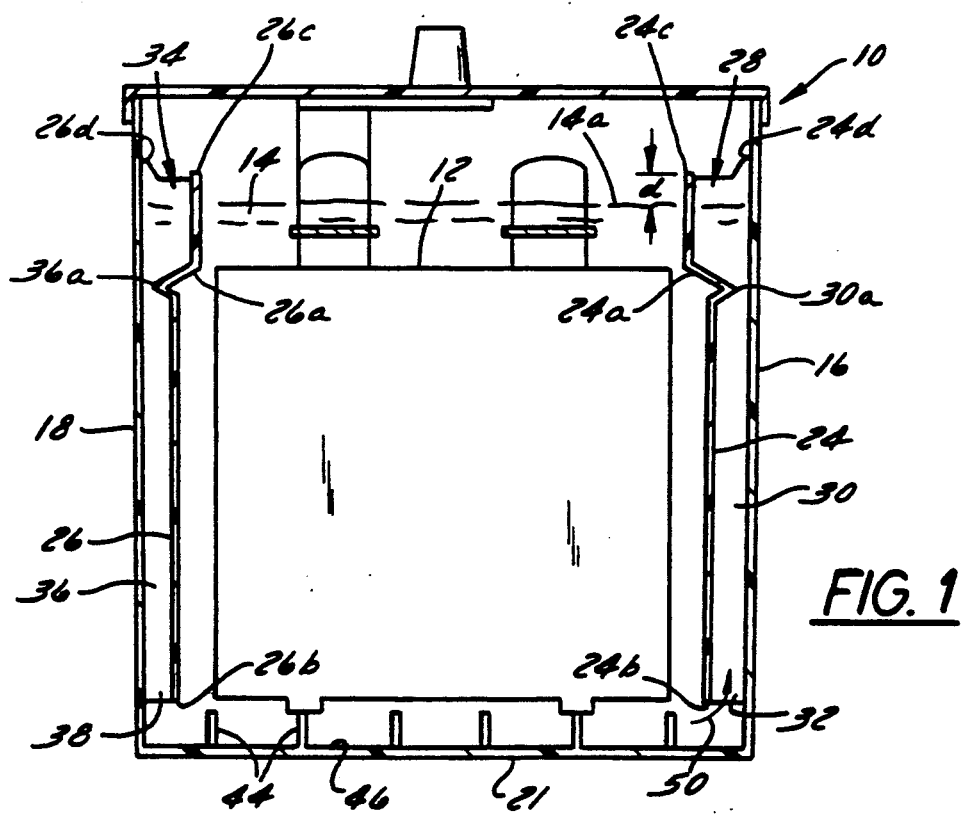
FIG. 1 is a vertical section of a cell of a battery showing a single electrode plate and a pair of hydrostatic pump elements.

Reference is made to FIG. 1 in which an electrode element 12 is positioned within a battery cell 10 and immersed in a liquid electrolyte 14. Running generally parallel to and spaced from wall 16 is an essentially planar partition 24 which, as seen in FIG. 2, is secured at each end thereof, respectively, to opposite end walls 20 and 22. A second partition 26 is similarly parallel and spaced from wall 18 and secured at each end thereof to walls 20 and 22. Each partition 24 and 26 extends above and below the surface 14a of electrolyte 14. The surface 14a is a surface of the electrolyte undisturbed by extraneous forces caused by the change in the momentum of battery 10 and is defined for purposes of this description as the "at-rest surface" of electrolyte 14.

Figure 3:
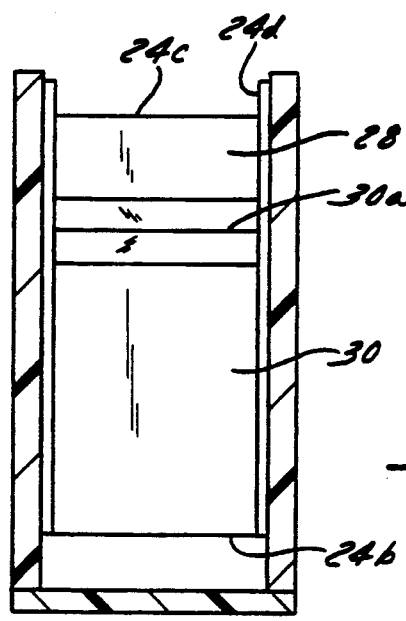
FIG. 3 is a side view of the cell of FIG. 1 with the cell wall removed to show the pump.

As seen in FIGS. 1 and 3, the top portion 24a of partition 24 diverges away from wall 16 to form a mouth 28 leading to a narrower throat 30 ending at an opening 32 formed between the distal end 24b and the bottom 21 of cell 10. Similarly, wall 18 and the top portion 26a of partition 26 form mouth 34 leading to throat 36 and terminating at opening 38 formed under distal end 26a. FIG. 2 depicts a battery having a plurality of cells 10 (indicated by dashed line across the battery) having mouths 28 and 34 running the longitudinal length thereof. Both partitions 24 and 26 include an inward construction at 30a, 36a to form respective throats 30 and 36. Partitions 24 and 26 also include a front lip 24c, 26c to prevent the electrolyte from splashing out once the mouth receives a wave. Each pump has side sealing flares or standoffs 24d, 26d at the top to seal the pump in place in its cell.

The distance that partitions 24 and 26 extend above surface 14a is a distance d and has a preselected range of values as discussed below. In the preferred embodiment openings 32 and 38 extend along bottom surface 21, the precise opening area thereof determined by various parameters as discussed below. As illustrated, however, distal ends 24b and 26b are slightly above mud rests 44 extending as planar members up from the bottom surface 46 of battery 10 which functions to contain residue falling from the electrodes 12. In a standard battery the mud rests extend across the battery from wall to wall although the mud rests may be staggered, as described and illustrated in the aforementioned application Ser. No. 07/201,042 incorporated by reference herein.

Figure 4:
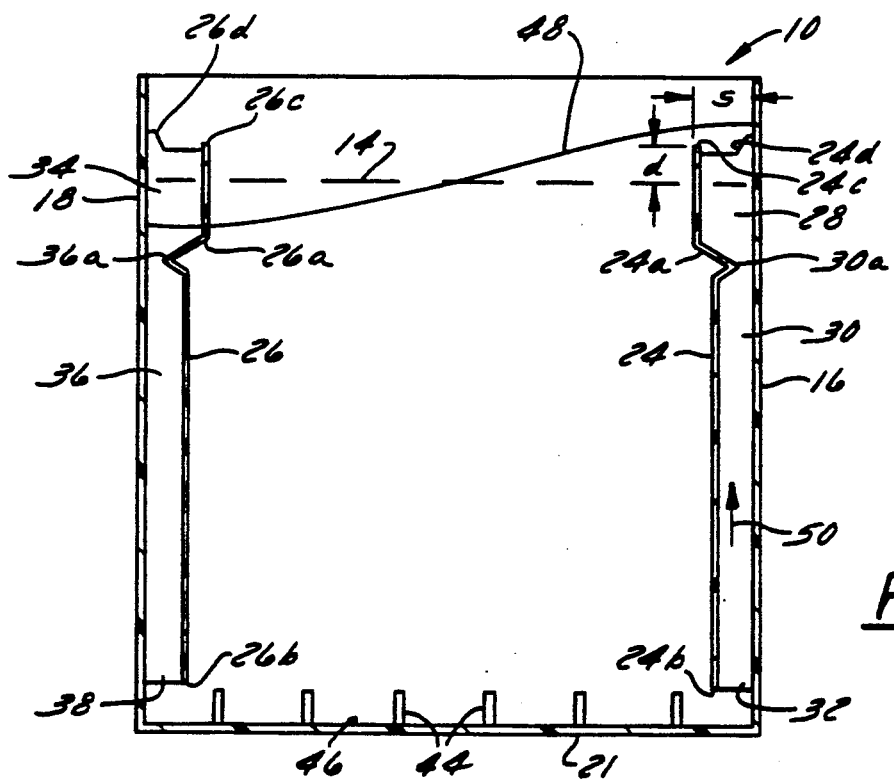
FIG. 4 is a section similar to FIG. 1 without the electrode plate depicting a wave in the electrolyte filling the pump mouth.

Reference is now made to FIG. 4 in which electrolyte 14 has been disturbed by linear acceleration, deceleration or change of direction, i.e., angular acceleration of battery container 10. A wave 48 has been formed which has a wave height exceeding distance d and when wave 48 moves against partition 24, a portion of the electrolyte is displaced into the confined region and trapped therein by mouth 28. Simultaneously, with the cresting of wave 48 into mouth 28, a surge of electrolyte moves upward into throat 30 as indicated by arrow 50. The restriction in throat 30, i.e., the narrow passageway 30a, substantially reduces the upward flow and minimizes splashing in mouth 28. Substantially all of the liquid filling mouth 28 is retained. Once the upward surge of electrolyte subsides, the electrolyte within the localized region defined by mouth 28 having a hydrostatic head relative to the electrolyte outside of the localized region and begins to equilibrate itself by forcing electrolyte down throat 30 and out through opening 32. The flow continues until the hydrostatic head no longer exists, i.e., the levels of electrolyte within and without the localized region being the same.

The circulation provided by the hydrostatic head pumps electrolyte less dense into the bottom interior volume of the electrolyte causing a flow of electrolyte to occur. A total redistribution of electrolyte can be affected in this manner depending upon the volume of electrolyte filling mouth 34, the number of waves occurring to provide the volume, and the total volume of electrolyte. For example, if a typical group 24 SLI battery was fitted with a hydrostatic pumps as described with a mouth volume of 6.5 milliliters, i.e., that volume defined by the at-rest surface 14a and the surrounding plate and wall surfaces, and fifty waves a day were experienced, the total electrolyte volume would be redistributed about once every 2.5 days. For batteries where stratification has not yet occurred, the flow tends to prevent electrolyte from stratifying; otherwise stratification which has already occurred will be early dissipated. The promotion of electrolyte flow also increases internal heat transfer. This in turn improves both battery energy density and battery life since uniform electrolyte distribution improves battery charge and discharge efficiently and reduces electrode grid corrosion caused by localized areas of high density sulfuric acid, and active material shedding.

When a wave crests against a stationary object such as wall 16, a secondary wave is created which moves in the opposite direction. Because the embodiment illustrated in FIGS. 1 and 2 has a second plate, i.e., plate 26, the secondary wave may have a height above the distance d inducing a hydrostatic head within the confined region defined by mouth 34 and further stimulating circulation of the electrolyte via opening 38.

The dimensions of plates and cell as described in reference to the preferred embodiment are typically small in the normal battery. For example, the width of a cell may be approximately 1.6", the height may be approximately 0.5" while the mouth has a dimension measured from plate to adjacent wall of approximately 0.5". The throat may narrow to $\frac{1}{8}$-3/32". The height d must necessarily have a value which will permit most waves to traverse the plate and yet together with the surrounding walls define a confined region having the volume necessary to contain sufficient electrolyte to induce an appropriately large hydrostatic head. The "volume" of the throat in the preferred embodiment is defined by the height d, the width of the cell and the separation distance "s" between plate and the adjacent parallel side wall. The volume is thus largely predetermined once the distance d is established for a particular cell configuration.

While the extension of the plate beneath the surface of the electrolyte is largely a matter of desired result, it is preferred to have the distal end of the plate sufficiently close to the bottom surface to direct a flow of electrolyte into the bottom region. This creates a desired mixing effect or electrolyte circulation.

Applicants have determined that if the effect of backwash is retarded for a short period of time while disturbances are occurring in the free electrolyte, then electrolyte can accumulate in the reservoir as a hydrostatic head and dissipate as desired into the body of electrolyte as a circulating current. The retardation of the backwash effect is particularly desirable when rapid deceleration occurs opposite from the pumping direction. Thus, the vitiating effects of backwash on the downward movement of electrolyte are most severe during the period disturbances are created in the electrolyte. Applicants have successfully overcome these effects through the provision of stationary restricting elements along the narrower passageway leading away from the reservoir to the openings along the bottom.

Figure 5A:
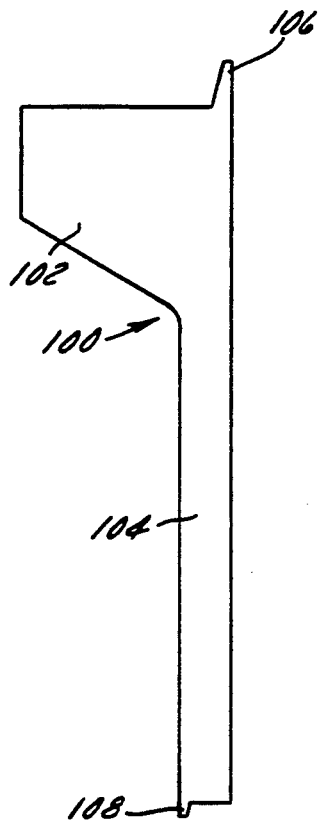
FIG. 5a is a side view of an alternative pump with another type of throat restriction.
Figure 5B:
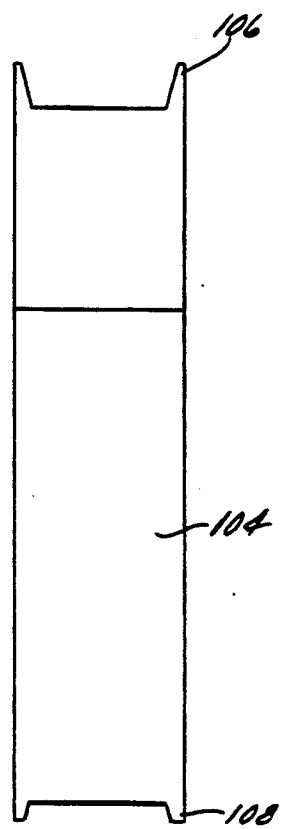
Figure 5C:
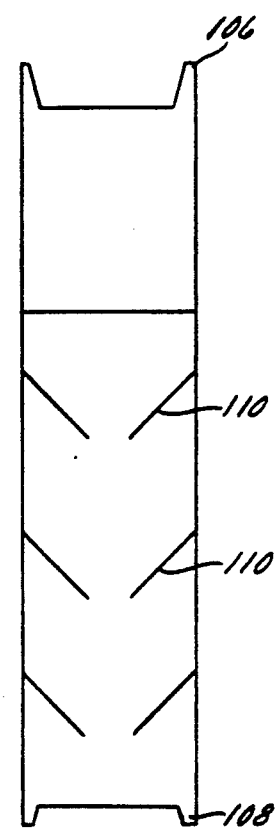

To clearly visualize the above, reference is made to FIGS. 5a-5c which shows various views of a hydrostatic pump fitted with a plurality of elements which restrict upward float through the pump throat. Pump 100 may be formed integrally through an injection molded process and positioned snugly within a cell against one of the lateral walls of the cell and secured thereto via standoffs 106, 108 by sealing or welding or, alternatively, the pump could be fabricated where the pump backwall is formed from the cell wall. In either case, reservoir 102 communicates with a narrow throat 104. A plurality of thin, planar elements 110, which may be formed integrally with the sides of throat 104, are depicted as stationary pairs of oppositely mounted elements 110 converging toward one another in a downward direction. It has been noted that the elements 110 mounted in this manner promote retardation of the upward moving electrolyte (due to backwash) and tend to diminish the energy of the backwash.

Figure 6A:
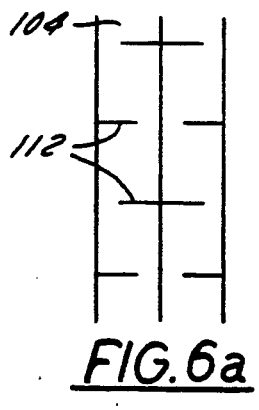
FIG. 6a is a rear view of another type of throat restriction.
Figure 6B:
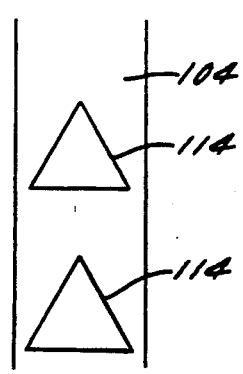
FIG. 6b is a rear view of still another type of throat restriction.
Figure 6C:
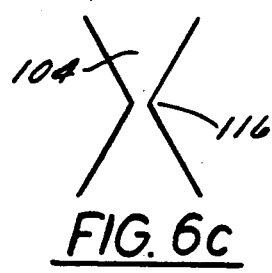
FIG. 6c is a rear view of yet another type of throat restriction.

Other configurations, however, may be utilized in the restricted confines of throat 104 for the same purpose. For example, as shown in FIGS. 6a–6c, parallel elements 112 (FIG. 6a) may be employed as well as pyramidal shaped elements 114 (FIG. 6b) and a constriction element 116 (FIG. 6c) which narrows throat 104 severely at a position intermediate reservoir 102 and the foot of throat 104.

Thus, superior circulation results are achieved by maintaining entire throat 104 narrow relative to reservoir 102 and through the provision of restricting elements which substantially reduce the effect of backwash upon the proper functioning of the pump. Other configurations and designs may be employed within the spirit of this invention without departing from the scope of the appended claims, such as non woven fibers 118 (FIG. 7a), orifice plates 120 (FIG. 7b), or generally any stationary (non-dynamic) item which could be used to reduce the cross sectional area of the throat portion of the pump.

Figure 7A:
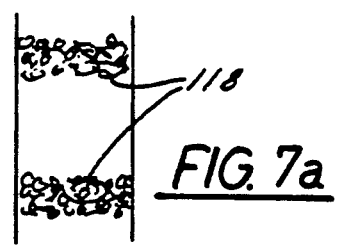
FIG. 7a is a rear view illustrating still another type of throat restriction serving as a filtering device.
Figure 7B:
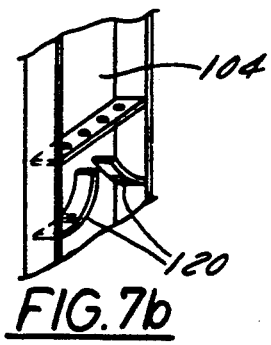
FIG. 7b is a rear view illustrating yet another type of throat restriction serving as a filtering device.

The impediment materials as described in FIGS. 7a and 7b can also be used as a filtering media to clarify the circulated electrolyte or to remove undesireable ions such as these comprised of antimony. The combined mechanisms of flowing electrolyte and filtration can produce a highly desirable effect. The flowing electrolyte will reduce stratification thereby improving life and performance, as well as improve battery heat transfer properties. A major failure mechanism of batteries can be the shedding of active material in the mud rest area. If left unchecked the active material will build up to a point where it is in contact with the bottom of the electrodes. This build up of silted PbO2 creates an electrical short between the electrodes, which causes battery failure. In the disclosed system the flowing (pumped) electrolyte will pick up this shed active material and carry it to filtering media (the same media used to retard backwash) located in the pump throat. The filtering media will entrap the silt while allowing the liquid to flow, thus creating two desired life prolonging effects. The eventual build up of material will hurt the efficiency of the pumping action, however it will have prolonged battery life by entrapping shed active materials in a place removed from the electrodes. The filtration (which will clearly work best with flowing electrolyte) will improve life by removing the shed active materials from the bottom of the battery, where they can build up and short the electrodes to filter media located in the pump throat which is far removed from the electrodes. The type of filter implemented can be as simple as properly designed ribs (located in the pump throat), which create stagnant fluid areas in the pump allowing the entrained mud to settle out, or a fibrous media designed specifically to trap particulate of the size common to battery plate sludge. The filter can be located over the entire cross section of the pump or partial areas.

In a similar manner ion removal from solution can be used to cleanse the acid of damaging impurities. Antimony migration from the positive grid to the negataive plate is known to increase battery gassing and water loss shortening life. A reducing media to capture these ions in the pump filtering area will successfully remove these ions from solution. High surface area lead, such as that forming on negative plates, is effective in removing antimony from solution.

It will be understood that the foregoing description is of a preferred exemplary embodiment of the present invention shown. Modifications may be made in design and arrangement thereof within the scope of the present invention, as expressed in the appended claims.

We claim:

1. A battery including a pump positioned within a cell of said battery having free electrolyte and for increasing the hydrostatic head of said electrolyte located in a volume fraction of the volume of the cell to cause circulation of said free electrolyte within said cell volume, said pump comprising:
   a reservoir which defines said volume fraction, said reservoir having a mouth portion for receiving free electrolyte when laterally moving surface waves are created in said free electrolyte;
   a throat communicating at an upper end thereof with said volume fraction in reservoir and extending downwardly therefrom, said throat communicating at a lower end thereof with said cell volume; and
   static means associated with said throat for decreasing the cross-sectional area of said throat intermediate said upper and lower ends thereby reducing the effect of upward moving electrolyte within said throat caused by changes in velocity of said battery.

2. The battery according to claim 1 in which said throat is defined by a plurality of vertical sides and said means comprises an inward construction in said vertical side.

3. The battery according to claim 1 in which said static means comprises a plurality of elements positioned within and secured to said throat and extend outward into the internal volume defined by said throat.

4. The battery according to claim 3 in which said plurality of elements are formed as pairs of elements secured to opposite sides of said throat and converge downward toward one another.

5. The battery according to claim 1, wherein said reservoir includes a lip on said mouth portion for retaining free electrolyte therein when said surface waves are created.

6. The battery according to claim 1, wherein said reservoir includes flare means for sealing said pump in said cell.

7. A battery including a pump positioned within a cell of said battery having free electrolyte and for increasing the hydrostatic head of said electrolyte located in a volume fraction of the volume of the cell to cause circulation of said free electrolyte within said cell volume, said pump comprising:

a reservoir defining said volume fraction, said reservoir having a mouth portion for receiving free electrolyte when laterally moving surface waves are created in said free electrolyte, said reservoir having cross-sectional area of about 5 to 25 cm$^2$ at said mouth and narrowing to a cross-sectional area of about 1 to 3 cm$^2$;

a throat communicating at an upper end thereof with said volume fraction in reservoir and extending downwardly therefrom, said throat communicating at a lower end thereof with said cell volume, said throat having a cross-sectional of about 0.5 to 3 cm$^2$ essentially along the entire length thereof; and static means restricting the cross-sectional area of said throat at least one point intermediate said upper and lower ends.

8. A battery according to claim 7, wherein said static means comprises filtering means for clarifying circulated electrolyte.

9. A battery according to claim 8, wherein said filtering means comprises non woven fibrous material.

10. A battery according to claim 8, wherein said filtering means comprises orifice plates.

11. A battery according to claim 7, wherein said static means includes ion removal means for clearing dissolved impurities from the electrolyte using a high surface area active material such as lead.

* * * * *